(12) United States Patent
Suciu et al.

(10) Patent No.: US 7,631,480 B2
(45) Date of Patent: Dec. 15, 2009

(54) MODULAR TIP TURBINE ENGINE

(75) Inventors: Gabriel L. Suciu, Glastonbury, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/720,529

(22) PCT Filed: Dec. 1, 2004

(86) PCT No.: PCT/US2004/040076

§ 371 (c)(1),
(2), (4) Date: May 31, 2007

(87) PCT Pub. No.: WO2006/059988

PCT Pub. Date: Jun. 8, 2006

(65) Prior Publication Data

US 2008/0206056 A1 Aug. 28, 2008

(51) Int. Cl.
F02C 3/04 (2006.01)
(52) U.S. Cl. ..................................... 60/39.43
(58) Field of Classification Search ................ 60/226.1, 60/226, 39.43; 415/143
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |

(Continued)

FOREIGN PATENT DOCUMENTS

DE 1301364 8/1969

(Continued)

*Primary Examiner*—Michael Cuff
*Assistant Examiner*—Vikansha S Dwivedi
(74) *Attorney, Agent, or Firm*—Carlson, Gaskey & Olds PC

(57) ABSTRACT

A tip turbine engine assembly includes a compressor module (12) and a fan module (14) located aft of the compressor module (12). The compressor module (12) and fan module (14) are fastened together along a mating portion with seals that generally prevent airflow from escaping through the mating portion. The compressor module (12) and fan module (14) are independently attachable to each other such that the compressor module (12) may be attached or detached to or from the fan module (14) without having to significantly disassemble the fan module (14), and verse visa.

19 Claims, 4 Drawing Sheets

U.S. PATENT DOCUMENTS

| | | | |
|---|---|---|---|
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| FR | 2274788 | 1/1976 |
| GB | 905136 | 9/1962 |
| GB | 1287223 | 8/1972 |
| GB | 1503394 | 3/1978 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059978 | 6/2006 |
| WO | 2006059979 | 6/2006 |
| WO | 2006059988 | 6/2006 |
| WO | 2006059989 | 6/2006 |
| WO | 2006060006 | 6/2006 |
| WO | 2006062497 | 6/2006 |
| WO | 2006059971 | 8/2006 |

MODULAR TIP TURBINE ENGINE

This invention was made with government support under Contract No.: F33657-03-C-2044. The government therefore has certain rights in this invention.

BACKGROUND OF THE INVENTION

The present invention relates to a tip turbine engine, and more particularly to a tip turbine engine assembly including a compressor module and a removable fan module.

An aircraft gas turbine engine of the conventional turbofan type generally includes a forward bypass fan and a low pressure compressor, a middle core engine, and an aft low pressure turbine all located along a common longitudinal axis. A high pressure compressor and a high pressure turbine of the core engine are interconnected by a high pressure shaft. Although highly efficient, conventional turbofan engines operate in an axial flow relationship that results in a relatively complicated and elongated engine structure. This elongated shape and complex structure may complicate initial assembly of the engine. Furthermore, subsequent maintenance tasks such as high pressure compressor preventative maintenance and the like, may require nearly the entire engine to be disassembled.

A recent development in gas turbine engines is the more longitudinally compact tip turbine engine. Tip turbine engines locate an axial compressor forward of a bypass fan, which includes hollow fan blades that receive airflow from the axial compressor therethrough such that the hollow fan blades operate as a centrifugal compressor. Compressed core airflow from the hollow fan blades is mixed with fuel in an annular combustor located radially outward from the fan. The combustor ignites the fuel mixture to form a high energy gas stream which drives turbine blades that are integrated onto the tips of the hollow bypass fan blades for rotation therewith as disclosed in U.S. Patent Application Publication Nos.: 2003192303; 20030192304; and 20040025490. The tip turbine engine provides a thrust to weight ratio equivalent to conventional turbofan engines of the same class within a package of significantly shorter longitudinal length.

Accordingly and because of the unique architecture and shorter longitudinal length of the tip turbine engine, it is desirable to provide a modular tip turbine engine assembly for simplified initial assembly and subsequent maintenance.

SUMMARY OF THE INVENTION

The tip turbine engine assembly according to the present invention provides a compressor module and a fan module located aft of the compressor module. The compressor module and fan module are fastened together along a mating portion with seals that generally prevent airflow from escaping through the mating portion. The compressor module and fan module are independently attachable to each other such that the compressor module may be fastened to the fan module without having to disassemble the fan module, and vice versa.

In another tip turbine engine assembly example, the fan module is independently mounted to an aircraft. Engine mounts on an exhaust case portion of the fan module are connected to a bracket and strut assembly that is structurally connected to the aircraft. The compressor module need not be fastened to the fan module before mounting the fan module on the aircraft.

In another tip turbine engine assembly example, the compressor module is independently mounted to an aircraft. Engine mounts on a forward case portion of the compressor module are connected to a bracket and strut assembly that is structurally connected to the aircraft. The fan module need not be fastened to the compressor module before mounting the compressor module on the aircraft.

The present invention therefore provides a compressor module and a fan module that are removably attached to each other.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
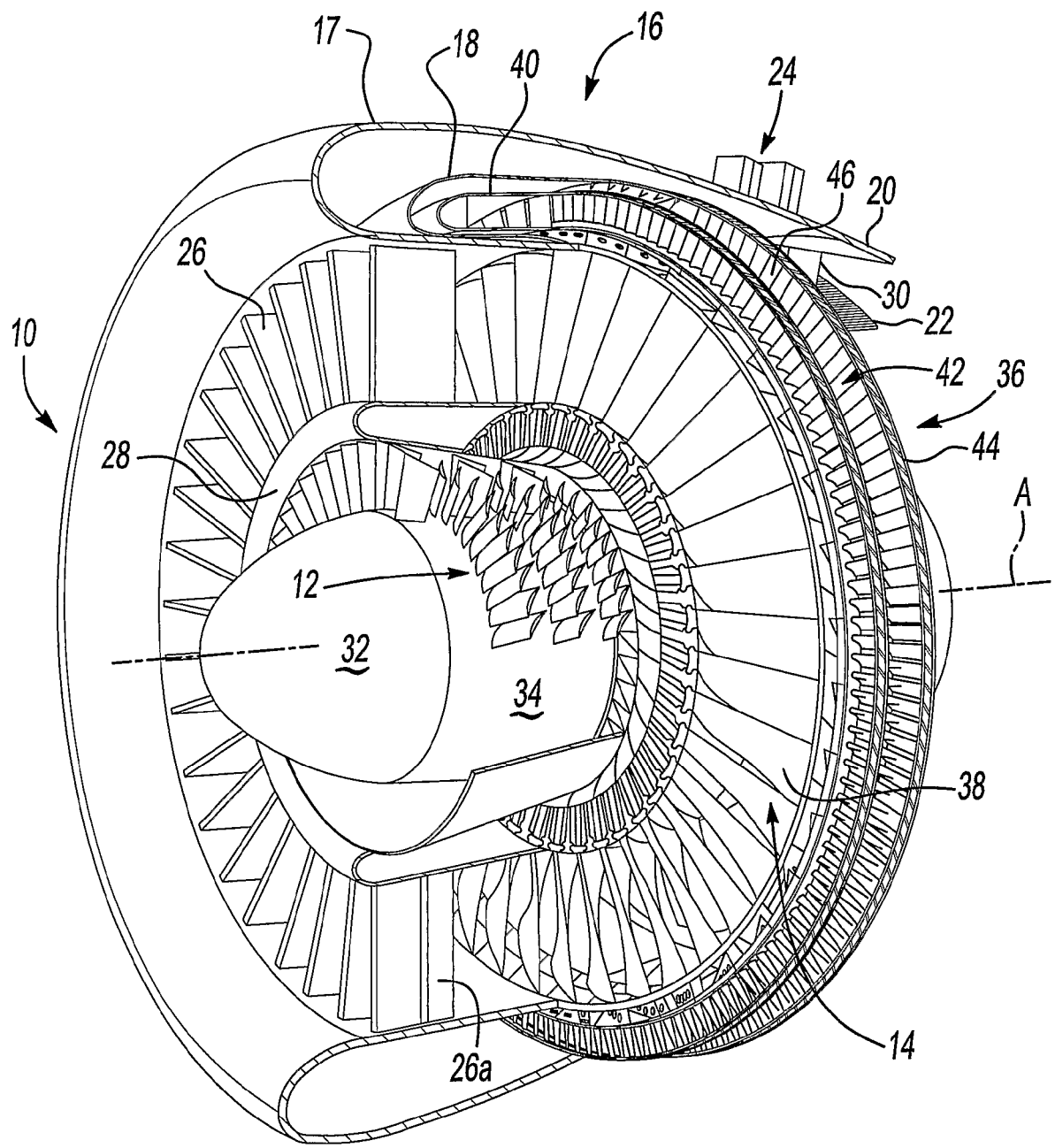
FIG. 1 is a partial sectional perspective view an exemplary tip turbine engine assembly of the present invention.

FIG. 1 illustrates a partial sectional perspective view of a tip turbine engine (TTE) type gas turbine engine 10. The engine 10 includes a compressor module 12 and a fan module 14 located aft of the compressor module 12. An outer structural case 16 encloses the compressor module 12 and fan module 14. The outer structural case 16 includes a nacelle 17, a static outer structural portion 18, and an exhaust case portion 20. The exhaust case portion 20 includes an exhaust mixer 22 and a plurality of engine mounts 24. A multiple of fan inlet guide vanes 26 are mounted between the outer structural case 16 and a static inner support structure 28. Each inlet guide vane 26 preferably includes a variable trailing edge 26A. A multiple of exit guide vanes 30 extend radially inward from the exhaust case portion 20.

A nosecone 32 is preferably located along the engine centerline A to improve airflow into an axial compressor 34. The axial compressor 34 is mounted about the engine centerline A behind the nosecone 32.

A fan-turbine rotor assembly 36 is mounted for rotation about the engine centerline A aft of the axial compressor 34. The fan-turbine rotor assembly 36 includes a multiple of hollow fan blades 38 to provide internal, centrifugal compression of the compressed airflow from the axial compressor 34 for distribution to an annular combustor 40 located within the outer structural case 16.

A turbine 42 includes a multiple of tip turbine blades 44 (two stages shown) which rotatably drive the hollow fan blades 38 relative to a multiple of tip turbine stators 46 which extend radially inward from the outer structural case 16. The annular combustor 40 is axially forward of the turbine 42 and communicates with the turbine 42.

Figure 2:
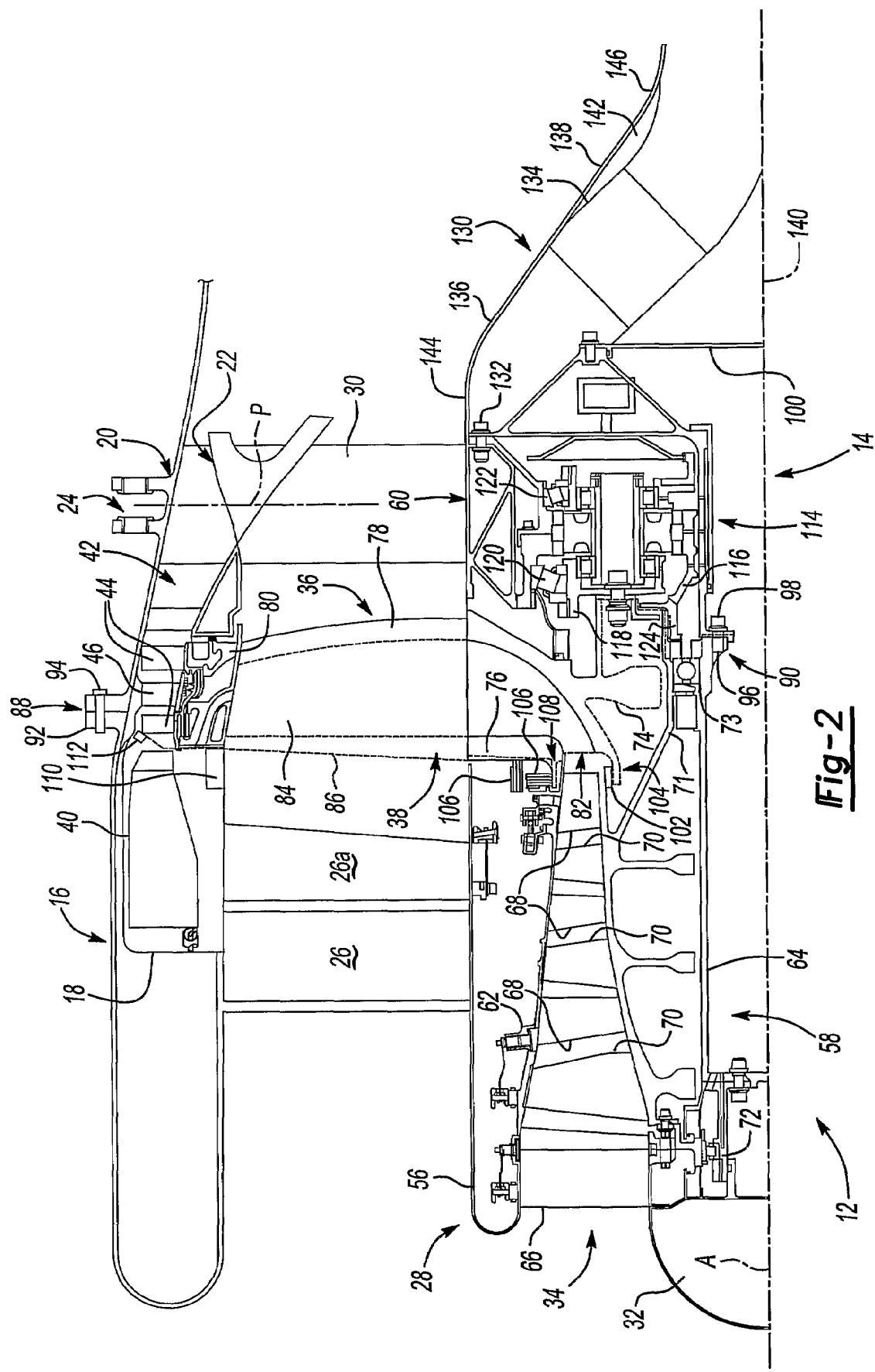
FIG. 2 is a cross-sectional view of the tip turbine engine of FIG. 1.

Referring to FIG. 2, the rotationally fixed static inner support structure 28 includes a splitter 56, a static inner support housing 58 and a static outer support housing 60 located coaxial to said engine centerline A.

The axial compressor 34 includes a compressor case 62. The splitter 56 extends from the compressor case 62 and attaches to the inlet guide vane 26. The compressor case 62 is spaced radially outward relative to the engine centerline A from a static inner support shaft 64 and is coaxial with the static inner support shaft 64. The compressor case 62 is fixedly mounted to a support member 66 that extends radially outward from the static inner support shaft 64. The static inner support shaft 64 structurally supports the compressor case 62. That is, the static inner support shaft 64 transfers the load of the compressor case 62 through the engine 10 to the outer structural case 16 via an engine support plane P.

A plurality of compressor vanes 68 extend radially inwardly from the compressor case 62 between stages of compressor blades 70, which are mounted on an axial compressor rotor 71. The compressor blades 70 and compressor vanes 68 are arranged circumferentially about the axial compressor rotor 71 in stages (three stages of compressor blades 70 and compressor vanes 68 are shown in this example). The axial compressor rotor 71 is mounted for rotation upon the static inner support shaft 64 through a forward bearing assembly 72 and an aft bearing assembly 73.

The fan-turbine rotor assembly 36 of the fan module 14 includes a fan hub 74 that supports a multiple of the hollow fan blades 38. Each hollow fan blade 38 includes an inducer section 76, a hollow fan blade section 78 and a diffuser section 80. The inducer section 76 receives airflow from the axial compressor 34 through an inducer opening 82 generally parallel to the engine centerline A and turns the airflow from an axial airflow direction toward a radial airflow direction. The airflow is radially communicated through a core airflow passage 84 within the fan blade section 78 where the airflow is centrifugally compressed. From the core airflow passage 84, the airflow is turned and diffused toward an axial airflow direction toward the annular combustor 40. Preferably the airflow is diffused axially forward in the engine 10, however, the airflow may alternatively be communicated in another direction.

The compressor module 12 and fan module 14 are fastened together along a mating line 86 and at an outer diameter 88 and inner diameter 90 of the engine 10. A first flange joint 92 at the outer diameter 88 is secured by a first fastener 94 of a plurality of fasteners located about the outer diameter 88. A second flange joint 96 at the inner diameter 90 is secured with a second fastener 98 of a plurality of fasteners located about the inner diameter 90. The second fastener 98 is accessible by removing a cover 100. Installation or removal of the fasteners at the outer diameter 88 and inner diameter 90 allow both the compressor module 12 and fan module 14 to be independently attachable to each other. That is, the compressor module 12 may be fastened and unfastened to or from the fan module 14 without having to significantly disassemble the fan module 14, and vice versa.

The compressor module 12 includes a lower compressor seal 102 located along the mating line 86 at an inner diameter 104 of the inducer opening 82 of the inducer section 76. Two upper seals 106 along the mating line 86 are located at the outer diameter 108 of the inducer opening 82. The lower compressor seal 102 and two upper seals 106 mate between the axial compressor 34 and the inducer section 76 to form a seal that generally prevents compressed air from escaping through the mating line 86 during operation of the engine 10.

A lower combustor seal 110 along the mating line 86 is located radially inward from the annular combustor 40. An upper combustor seal 112 along the mating line 86 is located opposite from the lower combustor seal 110. The upper combustor seal 112 and lower combustor seal 110 mate between the annular combustor 40 and the fan-turbine rotor assembly 36 to form a seal that generally prevents gas flow from escaping through the mating line 86 during operation of the engine 10.

A gearbox assembly 114 aft of the fan-turbine rotor assembly 36 provides a speed increase between the fan-turbine rotor assembly 36 and the axial compressor 34. The gearbox assembly 114 is mounted for rotation between the static inner support housing 58 and the static outer support housing 60. The gearbox assembly 114 includes a sun gear shaft 116 which rotates with the axial compressor 34 and a planet carrier 118 which rotates with the fan-turbine rotor assembly 36 to provide a speed differential therebetween. The gearbox assembly 114 is preferably a planetary gearbox that provides co-rotating or counter-rotating rotational engagement between the fan-turbine rotor assembly 36 and an axial compressor rotor 71. The gearbox assembly 114 is mounted for rotation between the sun gear shaft 116 and the static outer support housing 60 through a forward bearing 120 and a rear bearing 122. The forward bearing 120 and the rear bearing 122 are both tapered roller bearings and both handle radial loads. The forward bearing 120 handles the aft axial load, while the rear bearing 122 handles the forward axial loads.

The sun gear shaft 116 is rotationally engaged with the axial compressor rotor 71 at a splined interconnection 124 or the like. Alternatively, the gearbox assembly 114 could provide a speed decrease between the fan-turbine rotor assembly 36 and the axial compressor rotor 71.

A tailcone assembly 130 is mounted on the static outer support housing 60 with a set of fasteners 132, although only one fastener is illustrated in the FIG. 2. The tailcone assembly 130 houses a device 134, such as an oil cooler or other device, and includes a frustoconical surface 136. A wall structure 138 disposed about central axis 140 forms the frustoconical surface 136. The wall structure 138 defines an interior compartment 142 and a forward portion 144 that tapers to an aft portion 146 of the tailcone assembly 130.

In operation, air enters the axial compressor 34, where it is compressed by the three stages of the compressor blades 70 and compressor vanes 68. The compressed air from the axial compressor 34 enters the inducer section 76 in a direction generally parallel to the engine centerline A and is turned by the inducer section 76 radially outwardly through the core airflow passage 84 of the hollow fan blades 38. The airflow is further compressed centrifugally in the hollow fan blades 38 by rotation of the hollow fan blades 38. From the core airflow passage 84, the airflow is turned and diffused axially forward in the engine 10 into the annular combustor 40. The compressed core airflow from the hollow fan blades 38 is mixed with fuel in the annular combustor 40 and ignited to form a high-energy gas stream. The high-energy gas stream is expanded over the multiple of tip turbine blades 44 mounted about the outer periphery of the fan-turbine rotor assembly 36 to drive the fan-turbine rotor assembly 36, which in turn drives the axial compressor 34 through the gearbox assembly 114.

Concurrent therewith, the fan-turbine rotor assembly 36 discharges fan bypass air axially aft and the exhaust mixer 22 merges bypass air with the high energy gas stream in the exhaust case portion 20. The exit guide vanes 30 located between the static outer support housing 60 and the exhaust case portion 20 guide the combined airflow out of the engine 10 to provide forward thrust.

Figure 3:
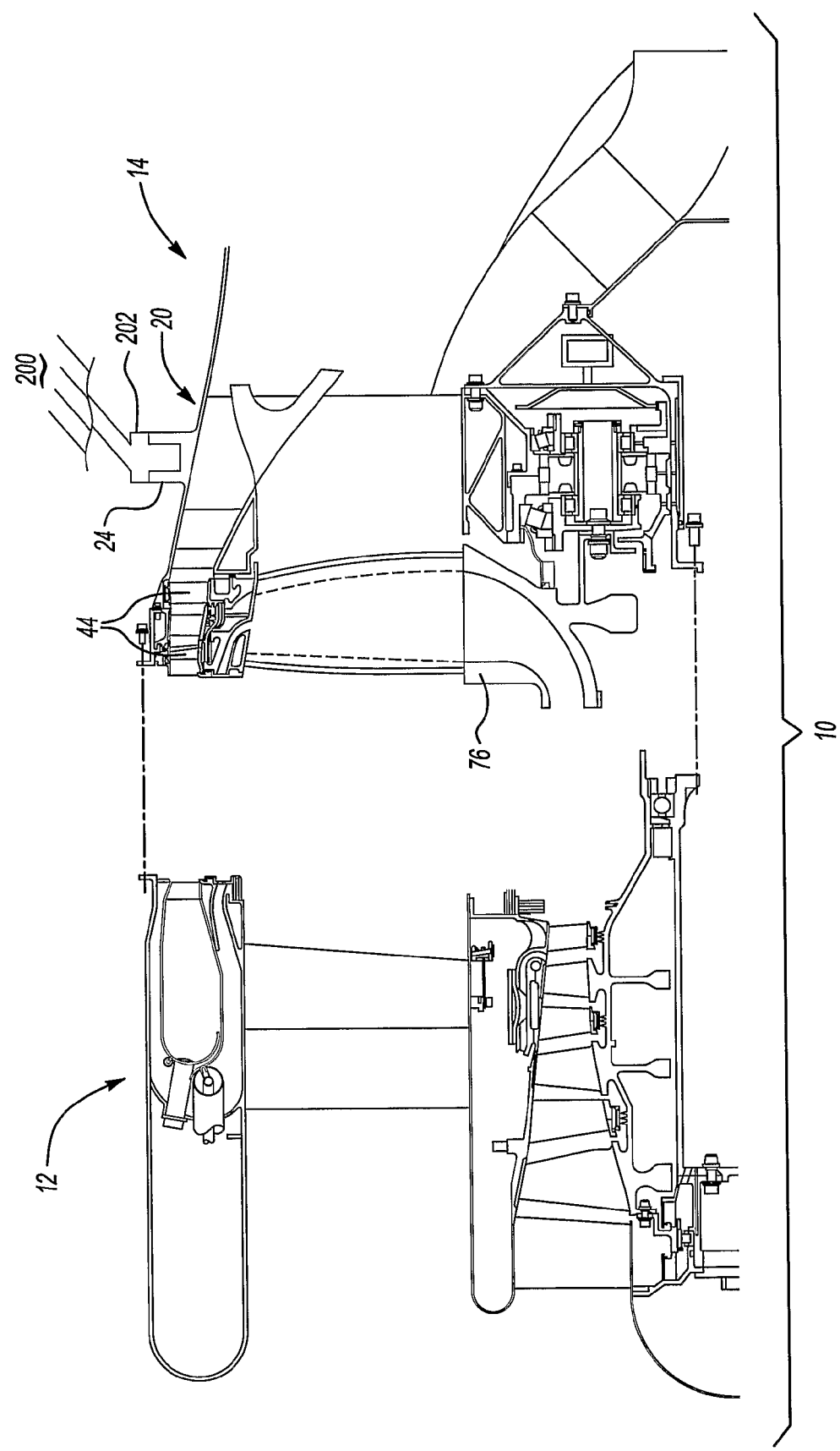
FIG. 3 is a cross-sectional view of the tip turbine engine assembly of FIG. 2 showing the fan module mounted to an aircraft.

FIG. 3 shows the tip turbine engine 10 split along the axially facing mating line 86 (FIG. 2) with the fan module 14 of the tip turbine engine 10 of FIG. 2 independently mounted to an aircraft 200. As can be appreciated from FIG. 2, the fan module 14 is considered to include all of the components aft of the mating line 86 and the compressor module 12 is considered to include all of the components forward of the mating line 86. As shown, the fan module 14 includes the fan-turbine rotor assembly 36 with the multiple of hollow fan blades 38 as well as the multiple of tip turbines blades 44 mounted about the outer periphery of the fan-turbine rotor assembly 36. In this case, the fan module also includes the gearbox assembly 114, exhaust case portion 20, exhaust mixer 22, and plurality of engine mounts 24. Also as shown, the compressor module 12 includes the compressor 34 and annular combustor 40. In this case, the compressor module 12 includes the outer structural portion 18. The engine mounts 24 of the exhaust case portion 20 of the fan module 14 are connected to a bracket and strut assembly 202. The bracket and strut assembly 202 is structurally connected to the aircraft 200, thus mounting the fan module 14 on the aircraft 200. The compressor module 12 need not be fastened to the fan module 14 before mounting the fan module 14 on the aircraft 200, although the compressor module 12 and fan module 14 may be fastened together and dually mounted on the aircraft 200. This assembly may provide the advantage of being able to remove the compressor module 12 from the aircraft 200, after an initial assembly, for maintenance or repair of the compressor module 12 or to gain access to the turbine blades 44, inducer section 76, or other component of the fan module 14.

Figure 4:
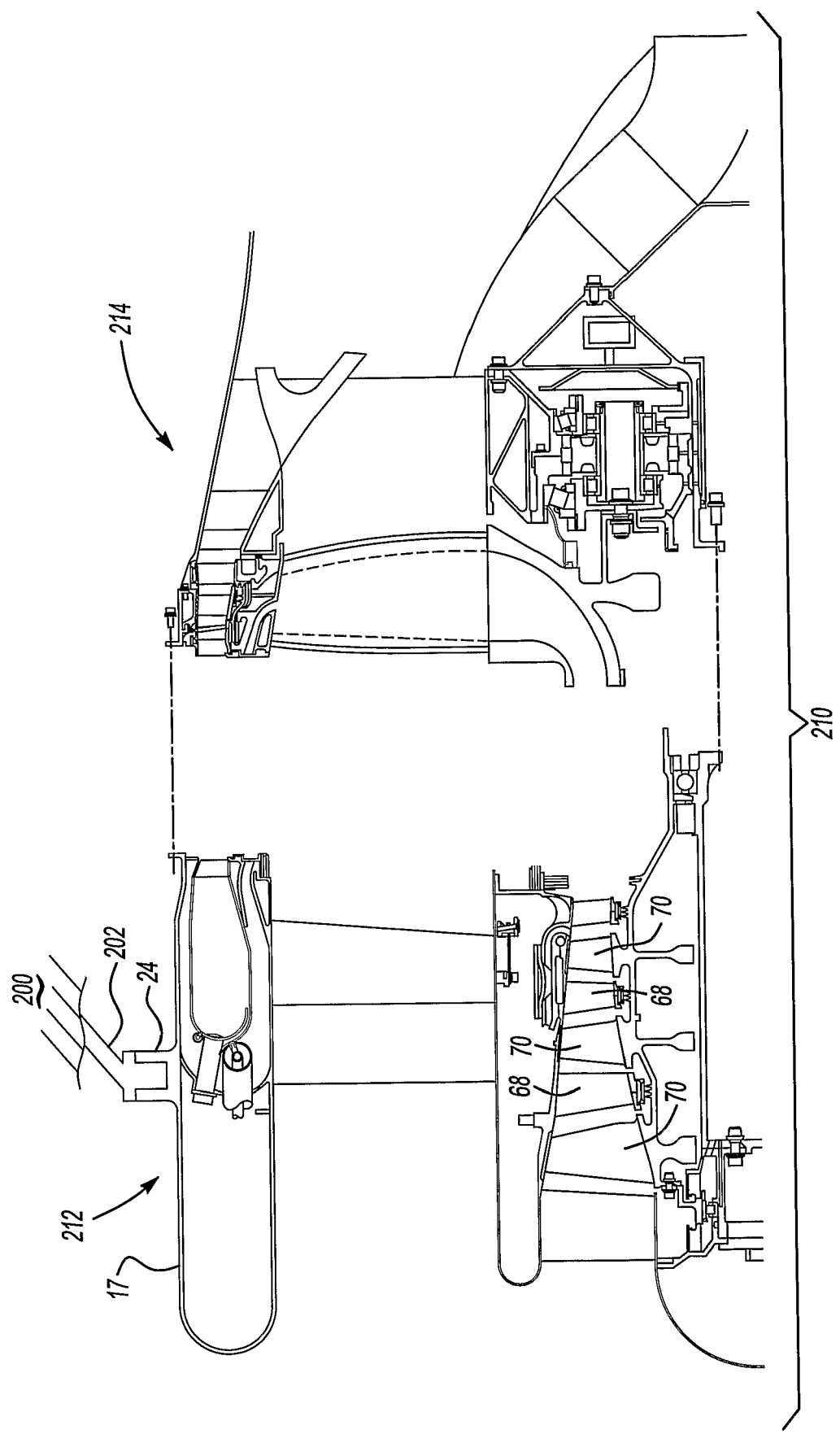
FIG. 4 is a cross-sectional view of another embodiment of the tip turbine engine assembly of the present invention showing the compressor module mounted to an aircraft.

FIG. 4 shows another embodiment of the tip turbine engine 210 of the present invention with the compressor module 212 independently mounted to the aircraft 200. Engine mounts 24 located on the nacelle 17 of the compressor module 212 are connected to a bracket and strut assembly 202. The bracket and strut assembly 202 is structurally connected to the aircraft 200, thus mounting the compressor module 212 on the aircraft 200. The fan module 214 need not be fastened to the compressor module before mounting the compressor module 212 on the aircraft 200, although the fan module 214 and compressor module 212 may be fastened together and dually mounted on the aircraft 200. This assembly may provide the advantage of being able to remove the fan module 214 from the aircraft 200, after an initial assembly, for maintenance or repair of the fan module 214 or to gain access to the compressor blades 70, compressor vanes 68, or other components of the compressor module 212.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tip turbine engine assembly comprising:
a compressor module having an axial compressor and an annular combustor located radially outwards from said axial compressor; and
a fan module aft of said compressor module and including at least a rotor and a plurality of hollow fan blades attached to said rotor, wherein said fan module and said compressor module are removably attached together such that, when attached, said combustor is located axially forward of said plurality of hollow fan blades.

2. An assembly as recited in claim 1, wherein each of said plurality of hollow fan blades defines a core airflow passage therethrough.

3. An assembly as recited in claim 1, wherein said fan module comprises a planetary gearbox driven by said hollow fan blades and a turbine mounted on an outer tip of said plurality of hollow fan blades for rotation therewith.

4. An assembly as recited in claim 1, wherein said compressor module is removable from an aircraft without removing said fan module.

5. An assembly as recited in claim 1, wherein said fan module is removable from an aircraft without removing said compressor module.

6. An assembly as recited in claim 1, further comprising a seal between said compressor module and said fan module.

7. An assembly as recited in claim 1, wherein each of said plurality of hollow fan blades defines a core airflow passage therethrough, each core airflow passage having a turn directed axially forward into said annular combustor.

8. An assembly as recited in claim 1, wherein said fan module includes a turbine located radially outward from said plurality of hollow fan blades.

9. An assembly as recited in claim 1, wherein said compressor module and said fan module include a common axially facing mating surface at least between said annular combustor and said plurality of hollow fan blades.

10. A tip turbine engine assembly comprising:
a first jet engine module including at least a rotor and a plurality of hollow fan blades attached to said rotor; and
a second jet engine module having an axial compressor and an annular combustor located radially outwards from said axial compressor and axially forward of said plurality of hollow fan blades, wherein said first jet engine module is independently detachable from a said second jet engine module without having to disassemble said second jet engine module.

11. An assembly as recited in claim 10, wherein at least one of said first jet engine module or said second jet engine module is independently attachable to an aircraft.

12. An assembly as recited in claim 10, wherein each of said plurality of hollow fan blades defines a core airflow passage therethrough.

13. An assembly as recited in claim 12, wherein said first jet engine module comprises a turbine located radially outward from said plurality of hollow fan blades.

14. An assembly as recited in claim 10, wherein said first jet engine module comprises a gearbox.

15. A method of assembling a tip turbine engine comprising:
(a) aligning a central axis of a compressor module having an axial compressor and an annular combustor located radially outwards from said axial compressor with the central axis of a fan module which is aft of said compressor module, said fan module including at least a rotor and a plurality of hollow blades attached to said rotor; and
(b) removably attaching the compressor module to the fan module such that, when attached, said annular combustor is located axially forward of said plurality of hollow fan blades.

16. A method as recited in claim 15, wherein said step (a) further comprises positioning the compressor module upstream from said fan module.

17. A method as recited in claim 15, wherein said step (b) further comprises forming a seal between the compressor module and the fan module.

18. A method as recited in claim 15, wherein said step (b) further comprises securing the compressor module and the fan module with a plurality of fasteners.

19. A method as recited in claim 18, wherein said step (b) further comprises securing the compressor module and the fan module at an outer diameter and an inner diameter.

* * * * *